United States Patent [19]

Pavone

[11] Patent Number: 4,963,217
[45] Date of Patent: Oct. 16, 1990

[54] METHOD OF MAKING A PLANAR WORK SURFACE

[75] Inventor: Robert J. Pavone, South Windsor, Conn.

[73] Assignee: The Gerber Scientific Instrument Company, South Windsor, Conn.

[21] Appl. No.: 292,763

[22] Filed: Jan. 3, 1989

Related U.S. Application Data

[62] Division of Ser. No. 153,810, Feb. 8, 1988, Pat. No. 4,816,847.

[51] Int. Cl.⁵ ............................................. B32B 31/14
[52] U.S. Cl. .................................. 156/295; 156/292; 156/330; 269/21; 408/1 R; 428/116
[58] Field of Search ...................... 156/292, 295, 330; 408/1; 269/21; 428/116

[56] References Cited

U.S. PATENT DOCUMENTS

| | | | |
|---|---|---|---|
| 3,040,802 | 6/1962 | Frazer | 156/584 |
| 3,755,049 | 8/1973 | Leloux | 156/584 |
| 3,912,380 | 10/1975 | Klein | 428/116 X |
| 4,173,510 | 11/1979 | Tobey | 156/584 |
| 4,216,048 | 8/1980 | Gehweller | 156/344 |
| 4,331,383 | 5/1982 | Christiansen | 428/116 X |
| 4,468,017 | 8/1984 | Pavone | 269/21 |
| 4,469,550 | 9/1984 | O'Steen, Jr. | 156/584 |
| 4,676,861 | 6/1987 | Bishop | 156/527 |

Primary Examiner—Robert A. Dawson
Attorney, Agent, or Firm—McCormick, Paulding & Huber

[57] ABSTRACT

A highly accurate positioning system used in connection with a photoplotter assembly employing a dual axis drive system having low mass and low inertia components. The drive elements of the system are low cost, high tensile strength drive bands that orient the driven members with high accuracy, low noise and require no lubrication. A photoplotter head and a moveable work table are similarly mounted to a base structure in a slideable manner utilizing a recirculating ball guide assembly and a flat rail roller assembly. The drive bands are moved by friction drive motors and a closed loop feedback control system orienting the photoplotter head and the work table relative to each other and utilize input only from the actual placement of the photoplotter head and the work table in calculating further movements. The work table is a lightweight element formed from a honeycomb infrastructure that provides individual vacuum chambers to hold a workpiece down on the work surface without external holding means. A method of providing a flat work surface includes utilizing a tool having a planar surface and bonding a thin sheet of material to the infrastructure when the thin sheet is placed on the tool surface.

14 Claims, 6 Drawing Sheets

METHOD OF MAKING A PLANAR WORK SURFACE

This is a divisional of co-pending application Ser. No. 153,810 filed on Feb. 8, 1988 and now U.S. Pat. No. 4,816,849.

CROSS REFERENCE TO RELATED APPLICATIONS

The present application relates to copending application Ser. No. 157,285 filed on Feb. 17, 1988 entitled PHOTOHEAD SYSTEM FOR POSITIONING AN APERTURE WHEEL AND METHOD OF MAKING AN APERTURE DISC and Ser. No. 158,338 filed on Feb. 22, 1988 entitled LAMP DRIVER SCHEME.

BACKGROUND OF THE INVENTION

This invention relates to an apparatus for performing a controlled operation on a workpiece, wherein a table having a workpiece support surface is moveable along a first linear axis and a work instrument is moveable along a second linear axis orthogonal to its first axis to achieve application of the instrument to a workpiece with a high degree of accuracy.

Apparatus of the type with which this invention is concerned may, for example, be used in a photoplotter to position the photohead relative to the workpiece. In such a device, a requirement for precise accuracy is important because the user may be generating on the workpiece graphic information both miniaturized and intricate U.S. Pat. No. 4,589,746, having a common assignee with the present invention, also addresses a concern for precise accuracy in a coordinate positioning environment. As is recognized in this patent, drive systems which effect X and Y coordinate movement must, to achieve accurate positioning, possess negligible play or backlash. A way to reduce backlash in a lead screw type drive system is to use a recirculating ball nut in which its balls are pressure loaded against the thread or threads of its lead screw. However, in a drive using a lead screw and a nut, the mass and inertia of both the nut and the lead screw require that a drive motor of significant power be used to move the parts of the system at reasonable accelerations. While such drives have proven to be very accurate in their performance of coordinate plotting operations, as well as being suited for high velocity movements of the workpiece relative to the work element, these drive systems tend to be relatively expensive in terms of manufacturing costs. For example, the lead screw in this type of system must be machined with particular tolerances in order that the desired accuracy of the coordinate control system may be achieved. This type of machining in the manufacturing process is a costly step and, if eliminated, could substantially reduce the price of the unit as a whole. Also, as previously mentioned, the attachment of the ball nut to the work table generates additional mass which must be compensated for in the selection of the size of the motor used to drive the system. Since the mass of the lead screw and the ball nut must be moved by a drive motor, the appropriate sizing of this motor relative to what is being driven is also reflected in its cost.

Other systems utilize gearing, such as a rack and pinion assembly or intermeshing circular gears, as the means for driving an X and Y coordinate positioning system. The intermeshing of gears introduce, however, an undesireable ratcheting effect to the workpiece. Ratcheting between gears occurs as teeth impact on each other. When a gear drive is employed in the environment of a photoplotter, the effects of ratcheting are realized when the user is generating graphic information of extremely minute proportions. When this type of graphic information is being created, the thickness of the line which is being exposed on the photsensitive workpiece is of such a thin thickness as to be sensitive to the effects of ratcheting. The detrimental effects of ratcheting are manifested in a desired straight line being drawn with a discontinuity or a linear irregularity. Furthermore, the cost of manufacturing the component gear parts in bulk becomes a factor given the close tolerances needed to accomplish the desired accuracy of the system. Also, gear drive systems require lubrication and tend to be noisy while also being subject to wear which reduces the accuracy of the component parts.

Accordingly, it is an object of the present invention to provide a dual axis coordinate plotting system, which executes position commands in both the X and Y coordinate axis at a maximum velocity of, for example, 400 inches per minute while also orienting the coordinate driven members in an extremely accurate and smooth manner without the detrimental effects of gear ratcheting.

Yet, another object of the present invention is to provide a coordinate control system having very high tightness in the joint connections while maintaining a low mass in the members which are subject to high inertial forces, thus giving low mass and low inertia to the system.

It is yet another object of the present invention to eliminate the effects of ratcheting by providing friction drive means to both the X and Y coordinate drive systems and to control these drive means by a closed loop feedback system having sensors which determine movements according to the actual X and Y position of the driven members.

A further object of the present invention is to provide a highly accurate coordinate control system of reduced cost by utilizing low mass, low cost structural components to orient the driven members and a reduced size electric motor to drive the low mass system.

A still further object of the present invention is to provide a drive system that does not utilize gears resulting in a quiet, lubrication free, nominal wear device.

SUMMARY OF THE INVENTION

The present invention resides in an apparatus capable of very accurately positioning a tool and a workpiece relative to one another and of moving such tool and workpiece relative to on another at high speeds and accelerations. The apparatus include a stationary support or base which moveably supports both a work table and a tool carriage. The work table and the tool carriage are respectively associated with drive systems which move these members relative to the base in a back and forth manner along linear orthogonal axes.

A slidable table, used in combination with the present invention is internally honeycombed to thereby reduce the mass to volume ratio and to resultingly lower the inertial force of the table as it moves relative to the support structure. The table has a flat work surface traveling back and forth in a first coordinate direction. By forming the table through a particular method using a tool, the flat work surface is achieved. This work surface possesses vacuum means for holding the workpiece in place on the work surface. Mounted to upwardly depending portions of the support structure is a tool carriage having a line of travel oriented perpendicular with the line of travel of the table. The tool carriage may carry different types of work elements and in particular may hold a photoplotter head used in operative relationship with a film element fixed to the work surface of the table.

Both the table assembly and the tool implement are driven by similar drive structures. Both members are moved within their respective coordinate axes by smooth surface steel bands which position the tool implement and the work table in a smooth and continuous manner without the effects of ratcheting found with intermeshing gear surfaces. Each of the drive bands are mounted to the base by smooth surface rollers which are frictionally engaged by drive motors to impart a desired displacement to the respective driven members. The frictional drive coupling between the rollers and the motors further contributes to the nonratcheting effect of the system.

A closed loop feedback control system is incorporated with the structure of the present invention to sense the movements of the work table and the tool carriage relative to the stationary support structure and to, in turn, generate drive signals to the drive motor assemblies for accurately moving the driven members on the coordinate system. Two separate linear scales are each independently connected with the tool carriage and the table assembly to thereby detect small movements of the driven carriage and table relative to the support structure and relate the sensor data back into the closed loop control system.

Accordingly, the invention provides for a positioning system that through the friction drive, eliminates the unwanted characteristic of racheting due to a gearing interface. The system, however, does provide for a closed loop control system that monitors the actual positioning of the work table and the tool carriage with respect to the support structure in order that any slippage which may inadvertently occur between the drive motor and the drive roller not affect the monitoring of this movement since only actual movement of the driven members is being sensed.

DESCRIPTION OF THE PREFERRED EMBODIMENTS

Figure 1:
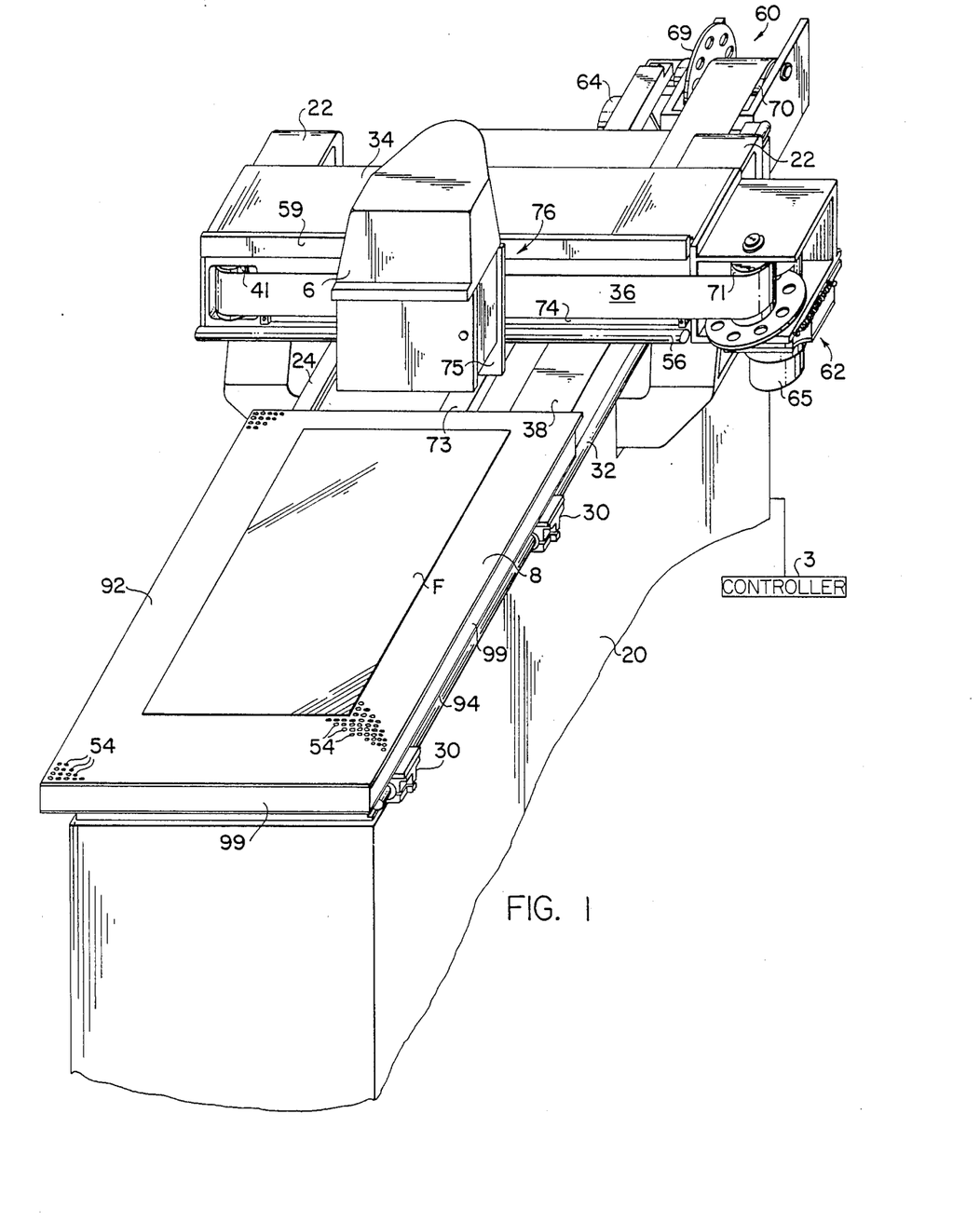
FIG. 1 is a perspective view of a photoplotter incorporating the present invention.

A photoplotter embodying the invention is shown in FIG. 1 and includes a support structure or base 20 which moveably supports both a tool carriage 76 and a moveable work table 8. The work table 8 is slidably mounted to a low friction guide 32 and a low friction rail 24 precisely aligning the work table 8 along its length of travel. Likewise, the base structure 20 supports the tool carriage 76 on a low friction guide 56 and on a low friction rail 59. The tool carriage 76 is supported by the base 20 in an elevated manner with respect to the table 8 using the arms 22 that are laterally spaced apart supporting a bridge 34. Rigidly fixed to the bridge 34 are the rail 59 and the guide 56 that provide a track upon which the tool carriage 76 travels. Mounted cooperatively with the tool carriage 76, on a tool carriage mounting plate 75, is the photoplotter head 6. The photoplotter head 6 and the work table 8 are driven by drive bands 36 and 38. The bands 36 and 38 are formed from thin sheets of steel strips having a thickness of approximately 0.5 millimeter and having smooth inner surfaces. Similarly, the rollers 70, 40 and 71, 41 which are rotatably mounted to the base 20, have smooth outer surfaces and engage with the smooth inner surfaces of the bands to rotatably support the bands relative to the base 20. It should be appreciated that the bands, when oriented longitudinally by the rollers 70, 40, 71, 41 translate the rotational motion of the drive rollers 70, 71 into linear movement. The bands, because of their sheet like cross-sections, are flexible in the sense of being rotatable around the rollers but are longitudinally inflexible when tensioned lengthwise by the rollers 70, 40, 71, 41 due to their high tensile strength. Stainless steel or any other like metal alloy possessing high strength tensile properties may be utilized in the formation of the bands 36 and 38. Also, the rollers 70, 40, 71, 41 are formed from any material providing sufficient friction and smoothness for engagement with the drive bands but are preferably formed from a material similar to that of the bands. Consequently, these bands provide a low cost and a negligible mass drive means for the system.

Figure 6:
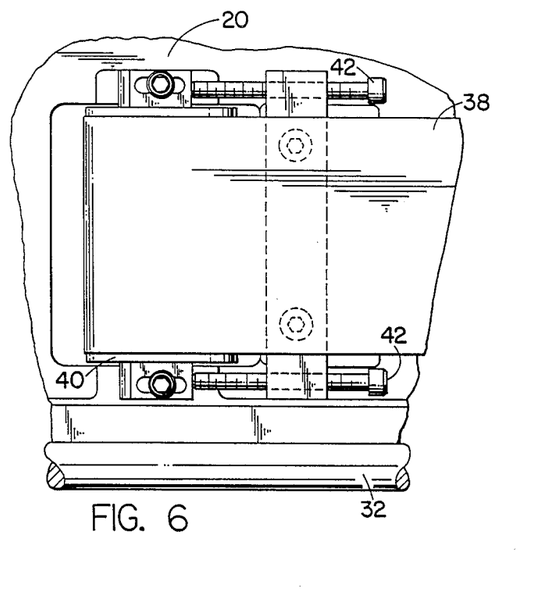
FIG. 6 is a isolated view of one of the two identical drive band tensioning mechanisms used in conjuction with the high strength drive band of the present invention.

As shown in FIG. 6, positive engagement between the rollers and the bands is accomplished by the longitudinal tensioning of the drive bands 36 and 38 using set screws 42 to longitudinally load the freewheeling roller 40. However, tensioning can be accomplished by other known means such as by spring loading or the like. By tensioning the drive bands 36 and 38 in a longitudinal direction, the bands behave, in a longitudinal sense, like a rigid beam pushing and pulling the attached member. This rigid behavior of the bands 38 and 36 increases the accuracy of the positioning system by allowing less motion to be absorbed in the drive connections. Furthermore, when the bands are tensioned, the smooth surface engagement between the rollers and the bands provides for the even transfer of rotation between the engaged elements.

The table 8 and the tool carriage 76, the driven members, are respectively connected with the bands 38 and 36 through drive attachments 44, 45. Each of the attachments 44, 45 is comprised of two light-weight plates which clamp therebetween a section of the related band member to each driven member using suitable attachment means such as small screws or the like. The outwardly depending surfaces of the drive attachments 44, 45 are oriented in a plane coincident with a juxtaposed attachment surface depending from the driven members 76 and 8.

Also in accordance with the invention, it is desirable to maintain the juxtaposed surfaces of the driven members 76 and 8 and the attachments 44, 45 in coincident planes by accurately supporting the sliding driven members at three different points. On each of the driven members 8 and 76, the first two points of slidable contact are coaligned on one side and engage respectively with the guides 32 and 56. Two recirculating ball mounts 30 are each attached in alignment with one another to the surface of the table 8 that faces the guide 32. Similarly, two ball mounts 3I are attached to the surface of the mounting plate 75 that faces the guide 56. Each of the recirculating ball mounts 30, 31 has a C-shaped channel formed therein which slidably receives the respective guides 32, 56. The mounts 30, 31 are made from a lightweight material such as plastic or the like and house balls recirculating into engagement with the associated guides 32 and 56 as the mounts 30 and 31 are moved. Since the C-shape of the mounts 30, 31 surroundingly captures the guides 32 and 56, lateral movement of the attached driven members 76 and 8, relative to the direction of travel, is prevented. Thus, the third support point need only provide a longitudinal bearing surface for the driven members 76, 8 because lateral retention has been provided by the mounts 30, 31.

Accordingly, the side of each of the driven members 76 and 8, laterally opposite the side supported by the respective pairs of mounts 30 and 31 slides along the accurately flat rails 24 and 59 on respective sets of opposed rollers 56, 58 and 66, 68. Each set of the rollers 56, 58 and 66, 68 correspondingly engages opposite surfaces of the respective rails 24 and 59 to provide a third point of sliding contact. In operation, the photoplotter head 6 is attached to the mounting plate 75 by commonly known means such as by nuts and bolts or the like. Accordingly, the photoplotter head 6 moves along the bridge 34 in a highly accurate and reproducible manner to expose upon the workpiece (F) precise graphic information. Likewise, the moveable table 8 travels in an accurate and precise path relative to the base 20 to correspondingly contribute to the precise formation of the graphic information.

The positioning system of the present invention, when utilized as a photoplotter, inscribes the graphic information on the workpiece (F) at a maximum velocity of, for example, 400 inches per minute and with an accuracy of ±0.001 inch. Subsequently, each of the driven members 76 and 8 must have a very low inertial force to permit the driven members to move and stop without the undesirable effects of unwanted momentum. Accordingly, the work table 8 is a lightweight member supported internally by a matrix of chambers defining a honeycombed internal structure 88. The mass to volume ratio of the table is lower than one having a solid volume. It should further be appreciated that the internal honeycomb structure 88 of the table 8 provides a rigid support infrastructure maintaining the planar dimensions of the table.

Figure 8A:
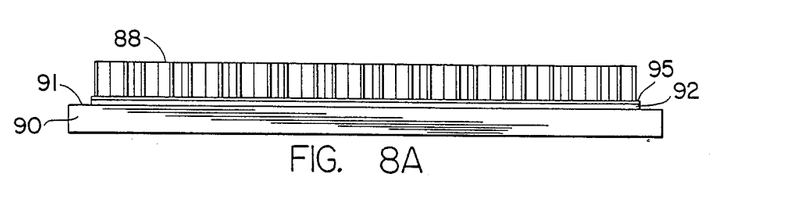
FIGS. 8a and 8b illustrate the method employed by the present invention in the assembly of the work table.
Figure 8B:
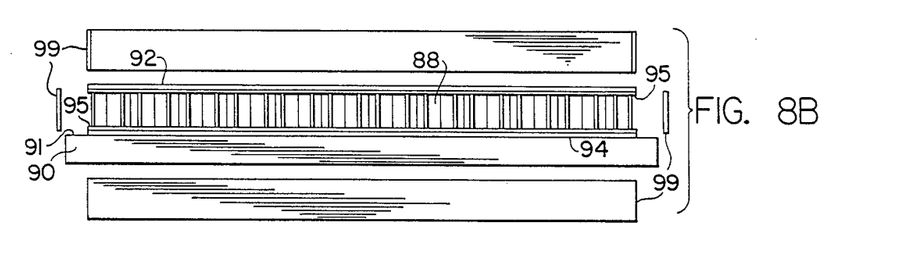

As shown in FIGS. 8a and 8b, the work table 8 is formed by a method insuring that both the table work surface and the opposite bottom surface are planar surfaces parallel with one another. A tool 90 is utilized to provide the planar dimensions of the work table. The tool work surface 91 is machined as a highly accurate planar surface. The work surface of the table 8 and the opposite table bottom surface, 92 and 94, are formed from thin, lightweight aluminum sheets or the like having a thickness of approximately 1.0 millimeter. Each sheet, when placed on the tool surface 91, conforms to the highly precise planar dimension of the tool surface 91. As has been previously mentioned, the honeycombed structure 88 provides an internal infrastructure to the table 8. Accordingly, the honeycombed structure or infrastructure 88 rigidly fixes the sheets 92 and 94 in two parallel planes defining the work surface and the bottom surface of the table 8.

As shown in FIG. 8a, a sheet 92 is first placed down on the surface 91. A layer of adhesive 95 is applied on the exposed surface of the sheet 92 and the honeycombed structure 88 is then positioned over the adhesive layer 95 covering sheet 92 and is placed through the adhesive layer 95 down onto the sheet 92. Any gaps existing between the contact surfaces defined by the vertically depending infrastructure edges and the sheet 92 due to edge irregularities, are thus filled by adhesive. When the adhesive sets and hardens, the infrastructure 88 becomes bonded to the sheet 92. Thus, the hardened adhesive filling any existing gaps between the contact surfaces provides structural support between the sheet 92 and the infrastructure 88. Since the sheet 92 is maintained against the tool surface 91 while the adhesive hardens, the planar dimension of surface 91 becomes fixed within the sheet 92 when the infrastructure 88 rigidly is bonded to the sheet 92.

Once the sheet 92 becomes rigid by bonding to one side of the infrastructure 88, the other unfaced side of the infrastructure 88 is then bonded to the other sheet 94 by the same method used in bonding the sheet 92. The plurality of side panels 99 formed from the same thin, lightweight material as sheets 92 and 94 are likewise attached to the lateral faces of the infrastructure 88. The panels 99 are bonded to the laterally outwardly depending side edges of the infrastructure 88 by an adhesive layer. Any number of types of adhesives can be utilized in the formation of the work table 8. An example of such a suitable adhesive is epoxy. Also, by utilizing an adhesive to assemble the table 8, the seams between the sheets 92 and 94 and the panels 99 are sealed forming an airtight chamber within the work table 8. The individual chambers of the honeycomb matrix are thus formed by the sealing engagement between the infrastructure 88 and the sheets 92 and 94.

In keeping with the invention, the sealed seams formed along the table allow a vacuum hold-down system to be maintained and fix the workpiece (F) in place. The vacuum hold-down thus avoids the need to use clamps or other fastening means that would otherwise add additional weight to the table structure. The vacuum duct 50 is connected to a vacuum source through a flexible hose. The workpiece (F) is held down onto the table 8 with air drawn through pin holes 54 and communicating through transverse perforations formed in the chamber walls of the honeycomb network 88 and through the duct 50. It should be noted that the pin holes 54 are drilled on the table 8 after the epoxy has set on the sheet defining the work surface and the transverse perforations formed in the honeycomb infrastructure 88 can be preformed. Also, each pin hole 54 corresponds with a chamber in the honeycomb infrastructure 88. As previously discussed, the photoplotter head 6 slides on the bridge 34 in a manner similar to slidable table 8. Since much of the photoplotter head 6 is empty space defining an optical Chamber, the mass to volume ratio of the photoplotter head 6 does not present a significant inertial problem in obtaining accurate positioning.

Figure 2:
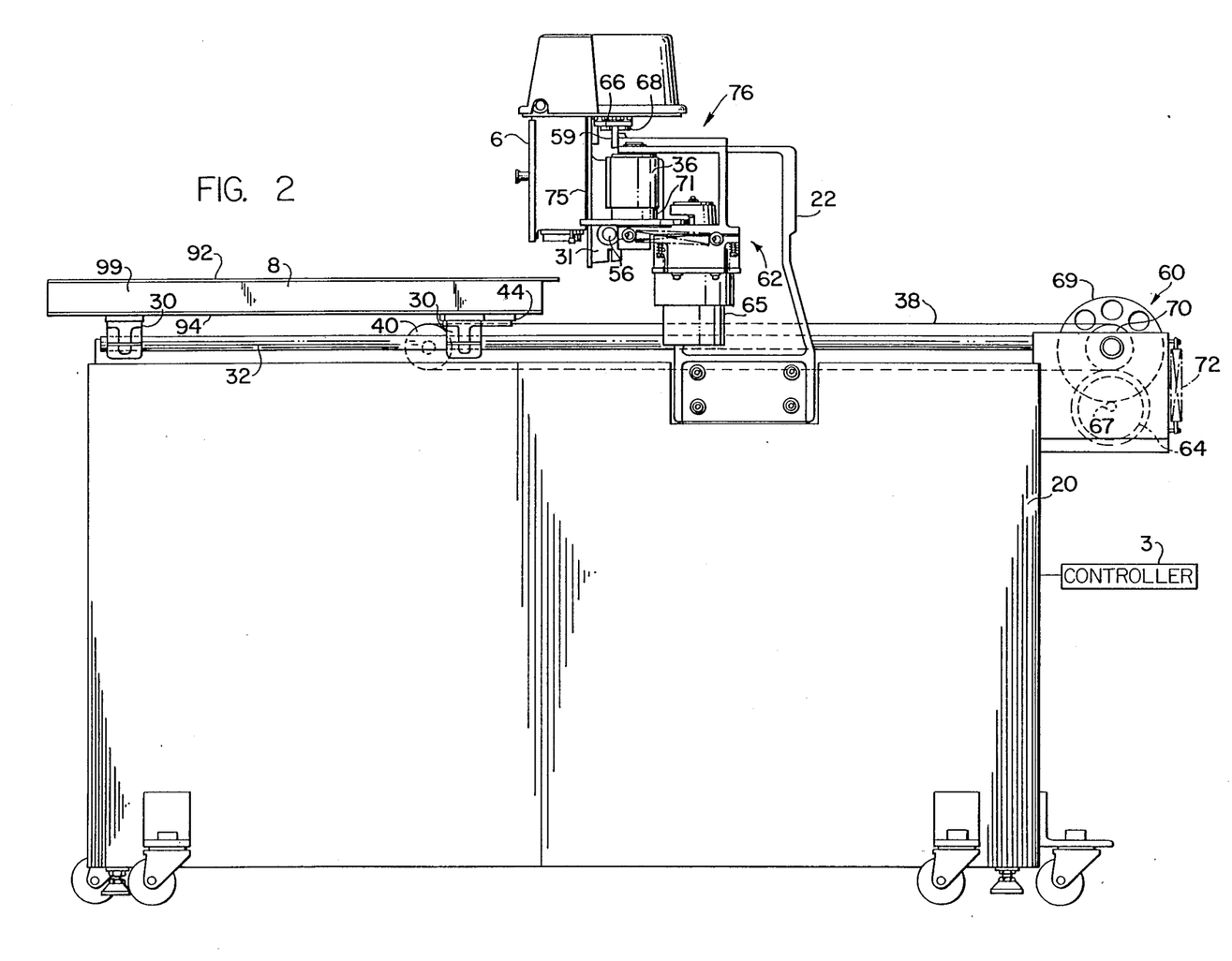
FIG. 2 is a side elevation view illustrating a photoplotter incorporating the present invention.
Figure 3:
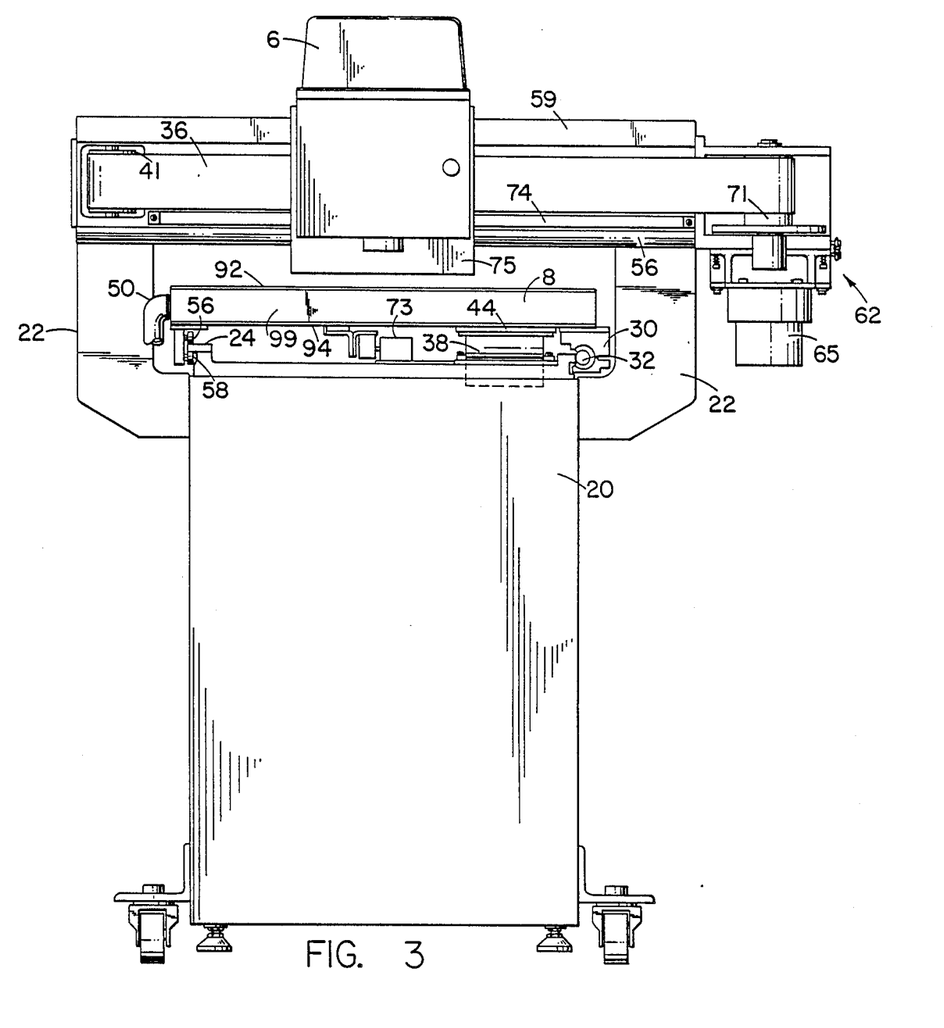
FIG. 3 is a front elevation view illustrating a photoplotter incorporating the present invention.
Figure 4:
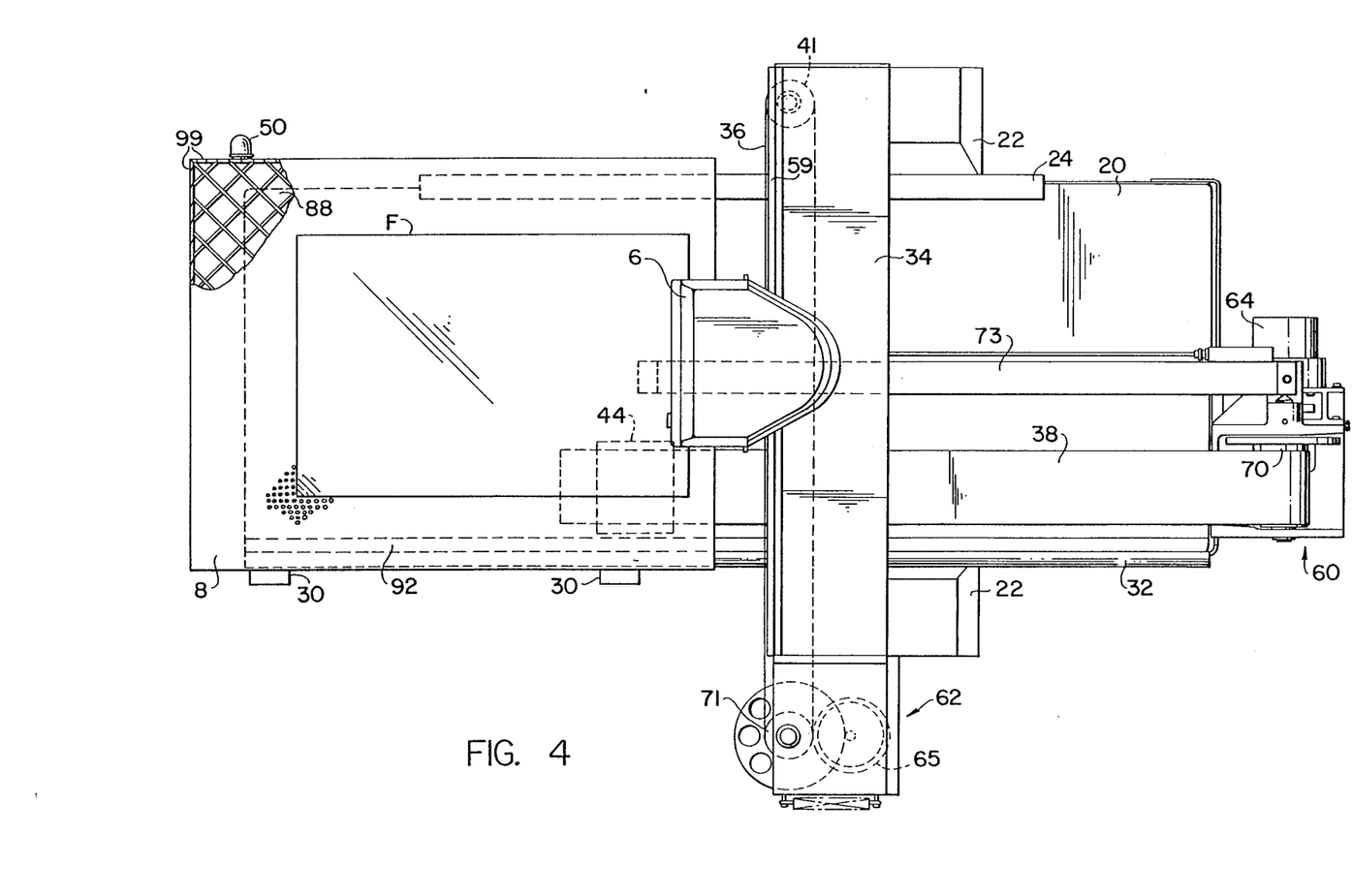
FIG. 4 is a top plan view illustrating a photoplotter assembly incorporating the present invention.
Figure 5:
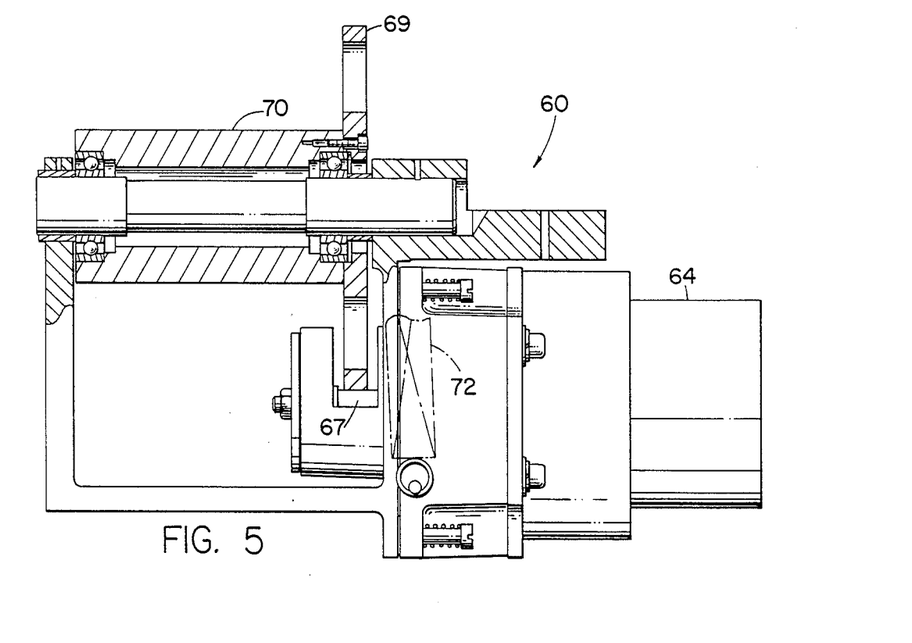
FIG. 5 is a sectional view taken through one of the two identical fiction drive mechanisms of the present invention.

As can be appreciated the work table 8 and the photoplotter head 6 are slidably mounted with very close tolerances on the respective guides 32, 56 and rails 24, 59. As a result, the driven members are very sensitive to the movement imparted by the bands 36 and 38. The drives utilized in the present invention, are however friction drives, and therefore the effects of ratcheting due to gear teeth impact are eliminated. Accordingly, the movement imparted to the belts 36 and 38 is a smooth, even and continuous drive motion. As best shown in FIG. 5, a drive assembly 60, identical to drive assembly 62, includes an electric motor 64 having extended at one end a smooth surface drive shaft 67 positively contacting a smooth circumferential outer surface of a flywheel 69. The flywheel 69 and the friction shaft 67 are maintained in positive engagement with each other by the tension spring 72 as illustrated in FIG. 2. Rotation generated by drive shaft 67 is imparted to the flywheel 69 by frictional engagement between the smooth surfaces of the drive shaft 67 and the flywheel 69. A drive roller 70 is attached to the flywheel 69 and transmits rotation from the flywheel to the bands 38. As a result, smooth and very fine movements of the driven members are achieved using the continuous motion of the flywheel 69 as it is frictionally driven by the shaft 67. Furthermore, the friction drive is cost effective because no additonal expense is incurred in manufacturing precision gear teeth on the interengaging surfaces of the flywheel 69 and the friction shaft 67.

While the contact between the drive motor 64 and the flywheel 69 is a positive engagement, circumstances may occur where minute amounts of slippage develop between the drive shaft 67 and the flywheel 69. The position control system utilized in the present invention, however, employs a closed loop feedback system receiving signals from the actual movements of the driven members 76 and 8 and is not affected by any lost motion due to inadvertent slippage. For a more complete description of a feedback system of this type, reference may be had to U.S. Pat. No. 3,872,368 issued on Mar. 18, 1975.

In operation, linear scales 73, 74 are oriented with the line of travel of the driven members 76 and 8 and utilize optical sensors to convert the movements of the driven members 76 and 8 into highly accurate electric data signals for use in the feedback circuits. The preferred type of sensor employed in the present invention utilizes a glass scale, supported on the base 20, having equidistantly spaced lines marked thereon and a photosensitive diode secured to the driven member travelling along the length of the scale. As the diode travels past the lines, in response to the movement of the driven member, the optical transitions are transformed by the diode into electric voltage patterns and these voltage patterns are in turn sensed by a detector and converted into a series of electrical pulses, one pulse for every line detected. The pulses corresponding to these transitions are then emitted by the detector. Since only the diode is attached to each of the driven members 76 and 8, significant savings in mass is further achieved resulting in the reduction of the aforementioned undesired momentum. For a further description of photsensitive pulse generating systems that may be utilized by the present invention, reference may be had to U.S. Pat. No. 3,884,580 issued on May 20, 1975.

Figure 7:
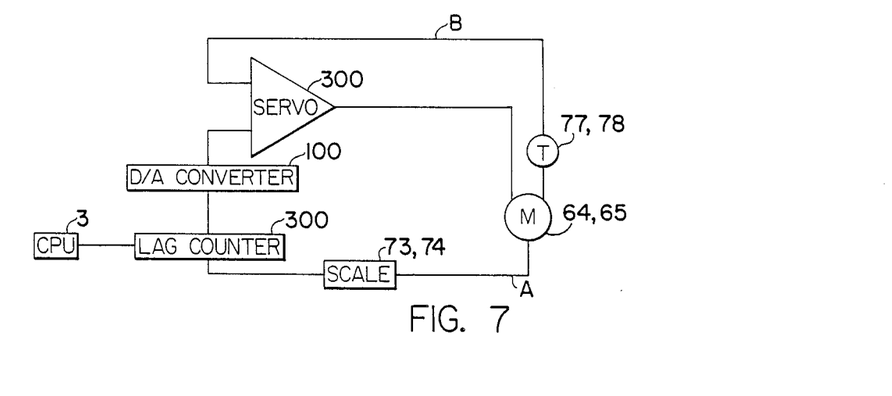
FIG. 7 is a block diagram illustrating the closed loop control system used with the structure of the present invention

Reference is now made to FIG. 7 wherein a block diagram illustrating the closed loop system utilized in the present invention is shown. It should be understood from FIG. 7 that the sensors and the motors are commonly labelled for illustration purposes only. In use, each sensor and drive motor pair is connected to a respective X or Y individual closed loop system. Each X and Y coordinate direction closed loop system as shown in FIG. 7, incorporates two loops, A and B, respectively relating to the position and the velocity of the driven members 76, and 8. Loop A, the positioning loop, is the primary logic of the closed loop system. Entered into a controller or computer processing unit 3 are data describing the X and Y position coordinates for the graphic information to be inscribed on workpiece (F). The controller 3 translates this coordinate position data into step pulses that are then transmitted to the lag counter 200. As previously discussed, the linear scales 73, 74 likewise generate step pulses corresponding to the actual movement of the particular driven member. The lag counter 200 receives as input the pulses from the linear scale and the X or Y position pulses from the controller 3. Both inputs are summated by the lag counter 200 and a demand or bridging signal is generated by the lag counter 200 into the digital-to-analog converter 100 representing the difference between the controller coordinate position signal and the signal generated by the respective linear scale. This bridging signal is then converted to an analog signal by the digital-to-analog converter 100 and an analog signal is subsequently inputted into the amplifier 300 of a servo system.

Secondary logic group (B) as previously mentioned, is a logic loop providing signals to the servo amplifier 300 indicating the speed at which the drive motors 64, 65 turn. A signal, generated by a respective one of tachometers 77, 78, mounted on the motors 64, 65, is the second input into the amplifier 300. Subsequently the amplifier 300 compares the analog bridging or error value generated by the converter 100 to the tachometer feedback signal and, as a result, generates either an increased or reduced drive power signal to the respective one of the motors 64, 65. The amplifier 300 will continue to generate the drive signal to the respective one of the motors 64, 65 until the signal inputted by the converter 100 is equal to zero. Thus, it should be appreciated that the control system utilized in the present invention positions the driven members by calculating from an actual present position, the distance to a next position and delivers to the drive motors a proportional drive signal. Accordingly, inadvertant slippage in the friction drives does not effect the positioning process.

While the present invention has been described in the preferred embodiment it should be understood that numerous modifications and substitutions can be had without departing from the spirit of the invention. For example, the band tensioning means as shown in FIG. 6, need not be biased by set screws but rather could be biased by any suitable known means. Accordingly the present invention has been described in the preferred embodiment by way of illustration rather than limitation.

I claim:

1. A method of forming a planar surface on a support infrastructure having edge portions defining first and second faces comprising the steps:

providing said support infrastructure in the form of a honeycomb structure defined by a matrix of chambers;

utilizing a tool having an accurately planar top work surface;

providing a thin first sheet of material capable of conforming to said accurately planar top work surface of said tool when placed on it to define said planar surface;

placing said thin first sheet of material upon said accurately planar top work surface to conform said first thin sheet of material to the accurately planar dimension of said top work surface of said tool;

applying a layer of adhesive to the surface of said first thin sheet of material not in contact with said top work surface of said tool;

positioning said support infrastructure over said adhesive layer and orienting said support infrastructure first face in confrontation with said adhesive layer applied to said first thin sheet of material;

placing said support infrastructure first face onto said first thin sheet material through said adhesive layer such that any gaps formed by the edge portions of said infrastructure first face not contacting with said thin sheet of material are filled by said adhesive; and allowing said adhesive to set and harden to thereby rigidly maintain the planar dimension defined by said top work surface on said thin first sheet of material.

2. A method of forming a planar surface on a support infrastructure having edge portions defining first and second faces as defined in claim 1 further comprising the steps:

removing said support infrastructure and said thin first sheet of material from said tool work surface;

providing a second thin sheet of material defining another planar surface;

placing said second thin sheet of material upon said accurately planar top work surface of said tool to conform said second thin sheet of material with said top work surface of said tool;

applying a layer of adhesive to the surface of said second thin sheet of material not in contact with said top work surface of said tool;

positioning said support infrastructure over said adhesive layer and orienting said support infrastructure second face in confrontation with said adhesive layer applied to said second thin sheet of material;

placing said support infrastructure second face onto said second thin sheet of material through said adhesive layer applied to said second thin sheet of metal such that any gaps formed by the edge portions of said infrastructure second face not contacting with said second thin sheet of material are filled by said adhesive;

allowing said adhesive to set and harden to thereby rigidly maintain the planar dimension defined by said top work surface of said tool on said thin second sheet of material, and said adhesive layers bonding said infrastructure first and second faces to said first and second thin sheets of material, individually seal said chambers of said honeycomb infrastructure in an airtight manner.

3. A method of forming a planar surface on a support infrastructure having edge portions defining first and second faces as defined in claim 2 further comprising the step of providing said first thin sheet and said second thin sheet of material formed from aluminum.

4. A method of forming a planar surface on a support infrastructure having edge portions defining first and second faces as defined in claim 1 further comprising the step of drilling pin holes in said first thin sheet of material at positions corresponding generally to the position of each chamber of said matrix of chambers defining said honeycomb structure and underlying said first thin sheet of material.

5. A method of forming a planar surface on a support infrastructure having edge portions defining first and second faces as defined in claim 2 further comprising the steps:

providing an infrastructure having laterally outwardly extending edges defining a plurality of side faces;

providing a plurality of side panels corresponding in number to the number of said infrastructure side faces;

applying a layer of adhesive to each of said side panels and positioning each of said side panels on a respective side face of said infrastructure such that a portion of said adhesive layer applied to each of said side panels exists in the seam created between the plurality of side panels and said first and second thin sheets of material such that the adhesive seals said seams when dry to provide said infrastructure with an airtight surrounding surface.

6. A method of forming a planar surface on a support infrastructure having edge portions defining first and second faces, said method comprising the steps:

utilizing a tool having an accurately planar top work surface;

providing said support infrastructure in the form of a honeycomb structure defined by a matrix of chambers;

providing a thin sheet of material capable of conforming to said accurately planar top work surface of said tool when placed on it to define said planar surface to be formed;

placing said thin sheet of material upon said accurately planar top work surface to conform said thin sheet of material to the accurately planar dimension of said top work surface of said tool;

positioning said support infrastructure first face over said thin sheet of material;

applying adhesive between said support infrastructure first face and the surface of said thin sheet of material not in contact with said top work surface of said tool;

placing said support infrastructure first face onto said thin sheet material through said adhesive such that any gaps formed by the edge portions of said infrastructure first face not contacting with said thin sheet of material are filled by said adhesive; and allowing said adhesive to set and harden thereby rigidly maintaining the planar dimension defined by said top work surface in said thin sheet of material.

7. A method as defined in claim 6 further comprising the step:

drilling pin holes in said thin sheet of material at positions corresponding generally to the position of each chamber of said matrix of chambers defining said honeycomb structure.

8. A method as defined in claim 7 further comprising the step:

forming transverse perforations in said infrastructure between juxtaposed chambers of said matrix.

9. A method as defined in claim 8 further comprising the steps:
providing another thin sheet of material defining said planar surface to be formed;
placing said another thin sheet of material upon said accurately planar top work surface to conform said another thin sheet of material to the accurately planar dimension of said top work surface of said tool;
positioning said support infrastructure second face over said another thin sheet of material;
applying adhesive between said support infrastructure second face and the surface of said another thin sheet of material not in contact with said top work surface of said tool;
placing said support infrastructure second face onto said another thin sheet of material through said adhesive such that any gaps formed by the edge portions of said support infrastructure second face not contacting with said another thin sheet of material are filled by said adhesive; and
allowing said adhesive to set and harden thereby rigidly maintaining the planar dimension defined by said top work surface in said another thin sheet of material.

10. A method as defined in claim 9 further comprising the steps:
providing laterally outwardly extending edges on said support infrastructure respectively defining a plurality of support infrastructure side faces;
providing a plurality of side panels corresponding in number to the number of said support infrastructure side faces;
applying a layer of adhesive between each of said side panels and a respective side face of said support infrastructure and positioning each of said side panels on the respective one of said side faces of said infrastructure; and
providing a duct in one of said side panels.

11. A planar support infrastructure formed from the method defined in claim 10 wherein each of said one and said another thin sheets of material is formed from aluminum and wherein said adhesive is epoxy.

12. A planar support infrastructure as defined in claim 11 wherein said one and said another thin sheets of material each have a thickness of about 1.0 millimeters.

13. A method of forming a planar surface on a support infrastructure having edge portions defining first and second faces comprising the steps:
providing said support infrastructure formed from a honeycomb structure defined by a matrix of chambers;
utilizing a tool having an accurately planar top work surface;
providing a thin first sheet of material defining said planar surface;
placing said thin first sheet of material upon said accurately planar top work surface to conform said first thin sheet of material to the accurately planar dimension of said top work surface of said tool;
applying a layer of adhesive to the surface of said first thin sheet of material not in contact with said top work surface of said tool;
positioning said support infrastructure over said adhesive layer and orienting said support infrastructure first face in confrontation with said adhesive layer applied to said first thin sheet of material;
placing said support infrastructure first face onto said first thin sheet material through said adhesive layer such that any gaps formed by the edge portions of said infrastructure first face not contacting with said thin sheet of material are filled by said adhesive;
allowing said adhesive to set and harden to thereby rigidly maintain the planar dimension defined by said top work surface on said thin first sheet of material; and
drilling pin holes in said first thin sheet of material at positions corresponding generally to the position of each chamber of said matrix of chambers defining said honeycomb structure and underlying said first thin sheet of material.

14. A method of forming a planar surface on a support infrastructure having edge portions defining first and second faces, said method comprising the steps:
utilizing a tool having an accurately planar top work surface;
providing said support infrastructure in the form of a honeycomb structure defined by a matrix of chambers;
providing a thin sheet of material defining said planar surface to be formed;
placing said thin sheet of material upon said accurately planar top work surface to conform said thin sheet of material to the accurately planar dimension of said top work surface of said tool;
positioning said support infrastructure first face over said thin sheet of material;
applying adhesive between said support infrastructure first face and the surface of said thin sheet of material not in contact with said top work surface of said tool;
placing said support infrastructure first face onto said thin sheet material through said adhesive such that any gaps formed by the edge portions of said infrastructure first face not contacting with said thin sheet of material are filled by said adhesive; and
allowing said adhesive to set and harden thereby rigidly maintaining the planar dimension defined by said top work surface in said thin sheet of material; and
drilling pin holes in said thin sheet of material at positions corresponding generally to the position of each chamber of said matrix of chambers defining said honeycomb structure.

* * * * *